Sept. 1, 1970     J. B. SWETT ET AL     3,526,138
NESTABLE AND DRIPLESS MEASURING CUP
Filed Aug. 12, 1968
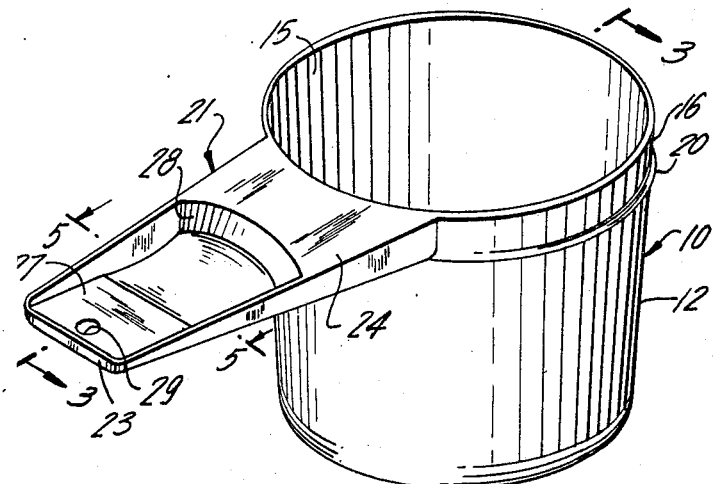
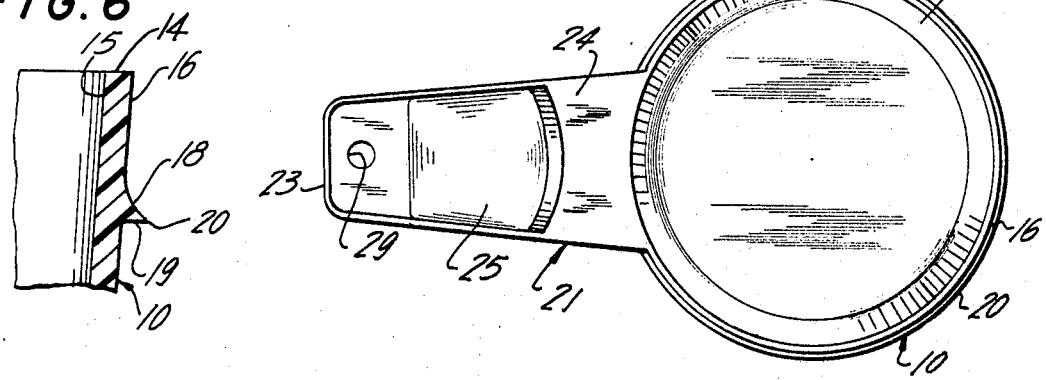
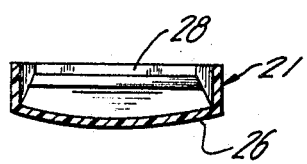
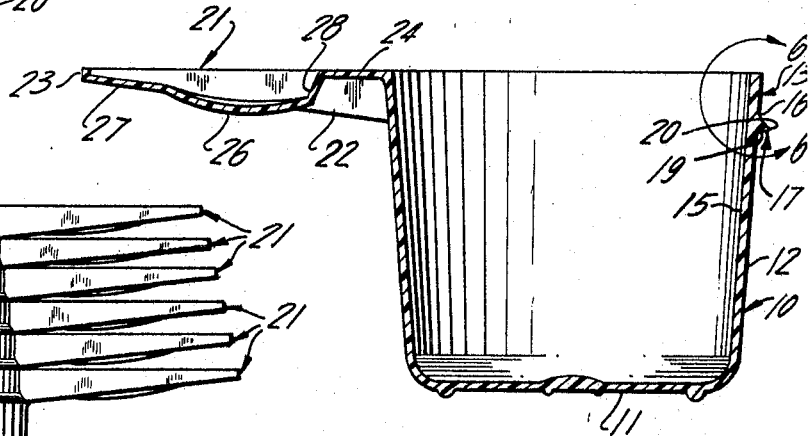
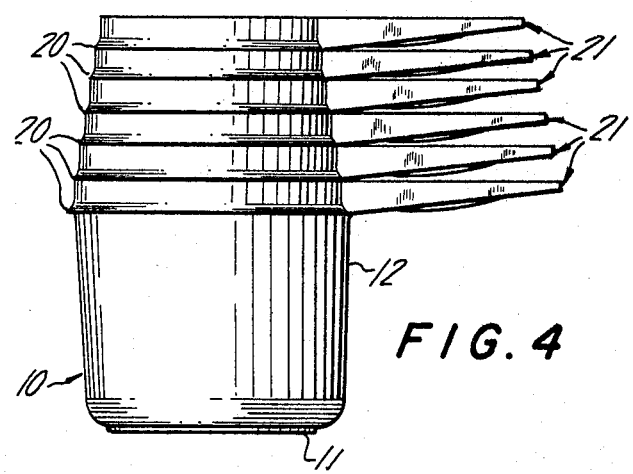
INVENTORS.
JAMES B. SWETT
BY SIDNEY Z. SMITH
Paul R. Wylie
ATTORNEY

United States Patent Office 3,526,138
Patented Sept. 1, 1970

3,526,138
NESTABLE AND DRIPLESS MEASURING CUP
James B. Swett, Barrington, R.I., and Sidney Z. Smith, Worcester, Mass., assignors to Dart Industries Inc., Los Angeles, Calif., a corporation of Delaware
Filed Aug. 12, 1968, Ser. No. 751,988
Int. Cl. G01f *19/00*
U.S. Cl. 73—426           6 Claims

ABSTRACT OF THE DISCLOSURE

A measuring cup having a rim around an upper edge portion adapting the cup to be placed in another larger size cup in nested relationship. A sharp edge portion is provided below the upper edge of the cup to cut off the drip when liquids are poured. The cup is provided with a handle that is adapted to be gripped by the thumb and forefinger for easy manipulation of the cup.

---

This invention generally relates to cups. More specifically, it relates to cups of the type that are used to measure quantities of liquids and solid ingredients for household cooking. The cups according to the invention are adapted to be nested with a cup of a smaller size fitting into a cup of a larger size.

A feature of the invention is a sharp rim located below a pouring surface. The utiliaztion of this sharp rim gives the cup a drip-free characteristic and renders it extremely useful for its intended functions in measuring and pouring liquids.

An object of this invention was the provision of a set of measuring cups that could be nested together.

Another object of the invention was the provision of a set of measuring cups, which when nested, would have a smooth outside contour.

Still another object of the invention was the provision of a peripheral rim around the edge of a measuring cup which would allow the cup to be placed in nested relationship within another larger cup.

A still further object of the invention was the provision of a cup having a handle with a thumb shaped indentation, said handle being proportioned with the remainder of the cup for ease of manipulation.

Another object of the invention was the provision of a cup of the foregoing type which could be formed by injection molding plastic materials.

The foregoing and other objects of the invention will be apparent from the following description and the accompanying drawings which show a specific embodiment according to the invention.

In the drawings:

FIG. 1 is a view in perspective showing a measuring cup according to the invention;

FIG. 2 is a bottom plan view of the measuring cup shown in FIG. 1;

FIG. 3 is a view in cross-section taken on line 3—3 of FIG. 1;

FIG. 4 is a side elevation view showing a plurality of the measuring cups according to the invention in nested relationship;

FIG. 5 is a view in cross-section taken on line 5—5 of FIG. 1; and,

FIG. 6 is an enlarged fragmentary view taken within line 6—6 of FIG. 3.

Referring now to the drawings, the cups according to the invention include a main container portion 10 having a bottom wall 11 and circular side walls 12. The side walls terminate in an upwardly directed peripheral brim 13. The upper edge 14 of the peripheral brim is substantially flat and can be provided with smoothly rounded corners. The smooth inside wall 15 of each cup slants downwardly and inwardly from the upper edge 14 to the juncture with bottom wall 11.

The outside wall 16 immediately adjacent the upper edge 14 also slants downwardly and inwardly. However, below the upper edge 14 of the peripheral flange 13 is an outwardly projecting peripheral rim 17 that extends around the entire pouring surface of the cup 10. This rim 17, as is best seen in FIG. 2, has an upper concavely curved surface 18 and a lower substantially flat surface 19 which converge and terminate in a relatively sharp edge 20.

This brim or lip construction provides a non-drip feature for the cups according to the invention. When a fluid or liquid is poured from the cup, any resultant drip is "cut-off" rather sharply by rim 17. For example, when water is repeatedly poured from a cup formed of high density polyethylene having the configuration of the preferred embodiment of the invention no dripping down the outside wall will occur. What drops are deposited on the outside, remain on surface 16, where they can be easily wiped from the cup with a sponge or cloth. This advantage of the cup eliminates the usual household problems of materials dripping from containers from which they have been poured to mar surfaces upon which the containers are subsequently placed.

The container 10 is further provided with a handle 21. This handle extends laterally from the container on a plane that is substantially even with the upper edge 14 of peripheral brim 13. Handle 21 includes a pair of converging ribs 22 which are disposed laterally from side wall 12 and brim 13. The axes of the ribs 22 are truncated before their point of convergence by connecting rib 23. An upper wall portion 24 extends between ribs 22 adjacent the side wall 12 and brim 13 of container 10. The handle 21 has a bottom wall 25 extending from rib 23 inwardly to a point below and adjacent upper wall 24. The bottom wall 25 includes an indentation 26 which is adapted to accommodate a user's thumb digit. A slanted inner wall 27 completes the bottom wall construction and connects impresion 26 with rib 23. Connecting wall 28 joins top wall 24 and indentation 26 and as shown in FIGS. 1 and 2, inner wall 27 can be provided with a hole 28 which is useful in hanging the cups from an elongate holder or wire.

Ideally, the cups according to the invention can be provided in one-fourth, one-third, one-half, two-third, three-fourth, and one cup sizes. When the cups are assembled they can be placed in a nested relationship to give the overall appearance of the nested cups in FIG. 4.

As will be evident from that figure, the diameter of sharp edge 20 of an individual cup and the diameter of the outside of upper edge 14 of a cup of the next larger size will be substantially the same. This permits the cups to be placed in a nested relationship to give an appearance of a continuous outside scalloped surface configuration.

The cups as shown can be formed by injection molding thermoplastic materials such as polyethylene or polypropylene. The parting line of the mold halves can be conveniently positioned along sharp edge 20 to give a unique surface characteristic at that point.

The foregoing describes a specific embodiment of the invention, the scope of which is defined by the following claims.

We claim:

1. A container having a drip-proof pouring construction at an opening therein comprising a main container portion having a bottom wall and side walls terminating in an upper edge and an outwardly projecting rim below said upper edge, said rim having an upper concavely curved surface and a lower substantially flat surface, said upper and lower surfaces converging to a relatively sharp edge that is adapted to eliminate any fluid drippage which may result during the use of said container.

2. A container comprising a main container portion having a bottom wall and side walls terminating in an upper edge and an outwardly projecting rim below said upper edge, said rim having an upper concavely curved surface and a lower substantially flat surface extending inwardly from the terminus of said upper concavely curved surface, said lower surface being substantially perpendicular with the outside wall of said container, said terminus between said upper concavely curved surface and said lower substantially flat surface defining a relatively sharp edge.

3. A cup of the type adapted to be used as a measuring cup comprising a main container portion having a bottom wall, and circular side walls terminating in an upwardly directed peripheral brim, the upper edge of said terminating brim being substantially flat, said cup having a smooth downwardly inwardly slanted inside wall and said brim having a downwardly and inwardly slanted outside wall immediately adjacent said edge and below which is disposed an outwardly projecting peripheral rim, said peripheral rim having an upper concavely curved surface extending outwardly from said outside wall to a relatively sharp edge terminus, and a lower substantially flat surface extending inwardly from said terminus in a substantially perpendicular relationship with the outside wall of said upwardly directed brim.

4. A cup of the type according to claim 3 and further comprising a handle means adapted to be used for tipping the cup to pour a fluid therefrom 5. A cup of the type adapted to be used as a measuring cup including a base wall and upstanding side walls terminating in an upwardly directed peripheral brim, said brim extending about the periphery of said upstanding side walls and being interrupted by a handle means extending laterally therefrom at a location on said periphery, said handle means comprising a pair of laterally disposed converging ribs the axes of which are truncated before their point of convergence by a connecting end rib, an upper wall portion extending between the upper portions of said converging ribs adjacent the side walls of said cup and terminating at a point spaced from the truncated end of said ribs, a bottom wall portion extending between the lower portions of said converging ribs and extending inwardly from said connecting end rib to a point adjacent the outer end of said upper wall, said bottom wall having an indentation adjacent said upper wall adapted to conform to a user's thumb digit and a flat angular planar portion located between said thumb shaped portion and said connecting end rib adapted to conform to the remainder of a user's thumb digit and a slanted connecting wall joining said thumb shaped portion and said upper wall.

6. A plurality of cups of different sizes, including at least one cup of a smaller size adapted to nest with a cup of a larger size, each of said cups comprising: a main container portion having a bottom wall, and circular side walls terminating in a peripheral brim, the upper edge of said brim being substantially flat, said cup having a smooth inside wall and an outside wall including an outwardly projecting peripheral rim disposed beneath said brim and upper edge, said peripheral rim having an upper concavely curved surface extending outwardly from said outside wall and terminating in a relatively sharp edge with a lower substantially flat surface that extends inwardly, therefrom, said lower substantially flat surface being substantially perpendicular with the outside of said brim, the radial length of the lower surface of one cup of a smaller size being substantially the same as the width of the edge portion of a cup of a larger size, the diameter of the relatively sharp edge between said upper and lower surfaces of said cup of a smaller size and the diameter of the outside of the upper edge of a cup of a larger size being substantially the same, whereby the cup of a smaller size will nest within the cup of a larger size and form what appears to be a continuous outside surface configuration.

References Cited

UNITED STATES PATENTS

| | | | |
|---|---|---|---|
| 603,635 | 5/1898 | Hager | 73—426 |
| 991,322 | 5/1911 | Kimball | 73—429 |
| 1,886,171 | 11/1932 | Dodge et al. | |
| 1,925,913 | 9/1933 | Wood | 73—426 |
| 2,858,041 | 10/1958 | Robinson. | |
| 2,879,917 | 3/1959 | Flack. | |
| 3,139,213 | 6/1964 | Edwards | 220—97 |
| 3,188,157 | 6/1965 | Rand | 220—23.8 X |
| 3,197,058 | 7/1965 | Hale | 220—23.6 |
| 3,363,469 | 1/1968 | Crane | 73—429 |
| 3,400,591 | 9/1968 | Larson | 73—426 |

LOUIS R. PRINCE, Primary Examiner

D. M. YASICH, Assistant Examiner

U.S. Cl. X.R.

220—97